United States Patent Office 3,720,532
Patented Mar. 13, 1973

3,720,532
HYDROPHOBIC SILICA
Edgar A. Simpson and Carroll F. Doyle, Ellicott City, Md., assignors to W. R. Grace & Co., New York, N.Y.
No Drawing. Filed Apr. 23, 1971, Ser. No. 137,031
Int. Cl. C09c 1/28
U.S. Cl. 106—308 Q
8 Claims

ABSTRACT OF THE DISCLOSURE

Hydrophobic silica materials are produced by fluid energy milling a silica hydrogel at a temperature of about 100° C. to 215° C. at an essentially atmospheric or superatmospheric pressure to yield a silica hydrogel having an active surface and a substantial silanol group population, and then contacting this milled active silica hydrogel product with a straight chain alcohol of from 4 to 20 carbon atoms at a temperature of about 135 to 220° C.

---

This invention relates to a novel method of producing hydrophobic silica materials. These hydrophobic silica materials, also known as organophilic silica materials, are useful as thickeners in organic substances such as resins, lacquers, paints and greases. These silica products are also useful for dispersing materials on water surfaces.

The novel process of this invention comprises the efficient production of hydrophobic silica products from silica hydrogel. In essence the process comprises the formation of an active silica by fluid energy milling a silica hydrogel to fine sized silica gel particles having an active silanol surface. These fine sized silica gel particles are then reacted with a straight chain alcohol of from about 4 to 20 carbon atoms. The only critical parameters of this process consist of the milling temperature which must be maintained at below about 215° C. so as to produce a substantial number of silanol groups; and the immediate reaction of this fine sized silica with straight chain alcohols at a temperature of 135 to 220° C. This reaction temperature is maintained at this temperature which is sufficient to cause reaction of the alcohol with the silanol groups, but insufficient to cause dehydration of the silanol groups.

The prior art in the area of hydrophobic silicas is of a somewhat limited scope. Iler in U.S. Pats. 2,657,149 and 2,801,185 sets out some of the basic techniques of producing hydrophobic silica gels. This comprises the addition of an alcohol to a silica sol and heating to azeotropically strip off water and form the hydrophobic silica. Goebel in U.S. Pat. 2,736,669 discloses a technique wherein the silica particles are dehydrated (activated) prior to reaction with an alcohol. And Young, in U.S. Pat. 2,856,268, discloses the production of a wax coated silica gel material by comilling a silica hydrogel and wax in a fluid energy mill. However, the prior art has not disclosed the production of a fine sized silica having an active silanol surface, and the reaction of these fine sized silica materials with organic alcohols. Further, there is disclosed a direct technique not requiring expensive autoclaves or distillation equipment.

It is, therefore, an object of this invention to set out an efficient technique for producing hydrophobic silicas requiring a low capital investment.

It is also an object of this invention to produce an active silica having substantial number of silanol groups by fluid energy milling a silica hydrogel at less than about 215° C.

It is further an object of this invention to react an active silica with alcohols of from 4 to 20 carbon atoms by heating a comixture at from about 135 to about 220° C.

Broadly, this invention comprises the forming of hydrophobic silica gels by first forming an active surface on a fine sized silica gel and having a substantial number of silanol groups, and then contacting this silica gel with a straight chain alcohol having 4 to 20 carbon atoms at 135° C. to 220° C. The active fine sized silica gel is produced by fluid energy milling, such as in a Micronizer, a silica hydrogel. The fluid energy mill should be operated at a temperature so that the product on exit has a temperature of from about 100° C. to 215° C. The fluid energy mill temperature may range from 300° C. to 1000° C. and produce a product in the temperature range of 100° C. to 215° C. The grinding fluid is preferably steam, but it may also be heated air, nitrogen, argon or similar gas or gaseous mixture.

The silica hydrogel which is ground in the mill is typically a washed acid or alkaline set silica hydrogel which contains about 50–80 percent water and about 20 to 50 percent silica gel. This feed to the fluid energy mill is also in a particle size range of 100 microns to a centimeter or more in average dimensional surface. In the fluid energy mill, the silica hydrogel is ground to a final particle size of 1 to 20 microns and dried to a water content of about 6 to 12 percent. It is essentially cleaved surfaces produced by the grinding which account for the active surfaces and the high silanol content silica gel. After milling, the now active surfaced silica gel should be immediately contacted with the alcohol. The active surface is present only for a short duration of time, with the rate of decay dependent on the time duration from silica cleavage and the temperature of the silica during this duration. As the temperature decreases, the silica active silanol groups tend to hydrogen bond, one to the other, resulting in groups of low reactivity with alcohols. Therefore, in a preferred embodiment, the active surface silica gel is contacted with the alcohol within one minute. This insures an active surface and that the silica gel will be in the raneg of 100–215° C.

In the second step of the proces of this invention, the active silica gel from the first step is heated with a straight chain alcohol of from 4 to 20 carbon atoms at a temperature of from 135 to 220° C. and preferably at about 145 to 205° C. The very useful and preferred alcohols consist of n-butyl, n-amyl, n-heptyl, n-octyl, n-nonyl, n-decyl, n-undecyl, n-dodecyl, n-tridecyl, n-quadridecyl, n-pentadecyl, n-hexadecyl, n-heptadecyl and n-octadecyl alcohols. These alcohols are comixed with the silica gel so as to produce a reaction mixture consisting of from about 10 to 40 percent alcohol by weight, preferably about 15 to 35 percent. This heating is continued for from .5 to 6 hours. This reaction may be conducted in an open vessel, a vessel with reflux, or a pressure vessel. Since the reaction temperature must be maintained at preferably between about 135 to 220° C., the alcohol used will govern the type of reaction vessel. Where the alcohol has a boiling point lower than 200° C. a pressure vessel will have to be used.

The hydrophobic silica is then separated from any excess alcohol by evaporation, solvolysis or similar technique and is ready for the desired subsequent use.

The uniqueness of this surface effect is further exemplified by the fact that if a silica gel after being fluid energy milled is allowed to stand, it will not form a hydrophobic silica on heating with a straight chain alcohol. As the period of time increases from formation of the surface in the grinding step, the surface becomes more passive. Some of the reactivity of the surface, however, can be restored by a thermal treatment. Such a thermal treatment consists of heating the silica gel at a temperature of from about 200° C. to 450° C. for at least about 1 hour, and preferably about 2 to 10 hours. When subsequently contacted with an alcohol, the surface of the silica will react with the alcohol to form a hydrophobic silica. However, the rate of reaction is at least 5 to 10 times slower than when a freshly ground silica is being reacted with the alcohol. That is, even though some reactivity can be restored to the silica, the reactivity of the surface present just subsequent to milling can never be restored.

The following examples are set out to further amplify the invention.

EXAMPLE I 820 g. of a sodium silicate solution containing 22 percent $SiO_2$ is admixed with 220 g. of 50 percent sulfuric acid to produce an acidic silica sol. This sol is set to a hydrogel by aging the sol for 6 hours. The hydrogel is washed salt free using a sulfuric acid solution of pH 3, followed by a deionized water rinse. This hydrogel contains about 70 percent water and in a particle size of about 6 mesh, and is then fed to a Jet Micronizer for grinding. The grinding fluid is steam at 500° C., with residence time in the mill in the millisecond range. The ground silica gel product, on exit from the mill, is at a temperature of 160 to 175° C., has about a 6.37 percent water content and an average particle size of 4 microns. 75 g. of this silica gel is added to the vessel which is at a temperature of 175–180° C., and 22.5 g. dodecyl alcohol is added. There is an exotherm after addition, and the reaction is complete after 5 minutes. The temperature is then reduced to 150° C. and excess alcohol driven off. The product is hydrophillic, having a pure white color.

EXAMPLE II

The procedure of Example I is repeated except that the reaction vessel is maintained at 165° C. The reaction is complete in 5 minutes and yields a pure white colored hydrophobic silica.

EXAMPLE III

The procedure of Example I is repeated except that octadecyl alcohol is used in place of dodecyl alcohol. The reaction is complete in 5 minutes and yields a white hydrophobic silica product.

EXAMPLE IV

The procedure of Example I is repeated except that octyl alcohol is used in place of dodecyl alcohol. The product is a white hydrophobic silica.

EXAMPLE V

The procedure of Example I is repeated except that the fluid energy mill product temperature is 250° C. This silica product, after being in contact with dodecyl alcohol at 205° C. for 10 minutes, shows only slight hydrophobic properties.

EXAMPLE VI

A 75 g. sample of a commercial grade silica gel (about 2 weeks since being milled) having a water content of about 6 percent and an average particle size of 4 microns is placed in a vessel maintained at 205° C. and dodecyl alcohol is added. After 45 minutes the excess alcohol is removed by distillation. The silica shows no hydrophobic properties.

EXAMPLE VII

A 75 g. sample of a commercial grade silica gel (about 2 weeks since being milled) is preconditioned by heating at 205° C. for 1 hour. 25 g. of dodecyl alcohol is then added, the vessel closed, and heating maintained for 45 minutes. After 45 minutes, excess alcohol is distilled off and the silica cooled. The product is hydrophobic.

What is claimed is:

1. A method for producing hydrophobic silica comprising:
   (a) fluid energy milling a silica hydrogel to produce an active surface, substantially dry, fine sized silica product having a temperature of from about 100 to 215° C.; and
   (b) immediately contacting this fine sized silica with an organic straight chain alcohol of from 4 to 20 carbon atoms at a temperature of about 135 to 205° C.

2. A method as in claim 1 wherein said alcohol is selected from the group consisting of n-butyl, n-amyl, n-hexyl, n-heptyl, n-octyl, n-nonyl, n-decyl, n-undecyl, n-dodecyl, n-tridecyl, n-quadridecyl, n-pentadecyl, n-hexadecyl, n-heptadecyl, and octadecyl alcohols.

3. A method as in claim 2 wherein the step of contacting said silica with said alcohol, said alcohol is in a concentration of from about 15 to 35 percent by weight.

4. A method as in claim 2 wherein said silica hydrogel is in a particle size of from about 100 microns to 1 centimeter and said active surfaced fine sized silica is in a particle size of from about 1 to 20 microns.

5. A process as in claim 2 wherein said alcohol is n-decyl alcohol.

6. A process as in claim 2 wherein said alcohol is n-undecyl alcohol.

7. A process as in claim 2 wherein said alcohol is n-dodecyl alcohol.

8. A process as in claim 2 wherein said alcohol is n-octadecyl alcohol.

References Cited

UNITED STATES PATENTS

| | | | |
|---|---|---|---|
| 2,736,669 | 2/1956 | Goebel | 106—308 Q |
| 3,223,333 | 12/1965 | Stephanoff | 106—309 |
| 2,858,284 | 10/1958 | Acker et al. | 106—308 Q |

DELBERT T. GANTZ, Primary Examiner

J. V. HOWARD, Assistant Examiner

U.S. Cl. X.R.

106—288 B, 309